United States Patent [19]

Chang

[11] Patent Number: 5,234,491

[45] Date of Patent: Aug. 10, 1993

[54] METHOD OF PRODUCING HIGH SURFACE AREA, LOW METAL IMPURITY

[75] Inventor: Hongtu Chang, Norristown, Pa.

[73] Assignee: Cabot Corporation, Boston, Mass.

[21] Appl. No.: 832,690

[22] Filed: Feb. 7, 1992

Related U.S. Application Data

[63] Continuation of Ser. No. 525,364, May 17, 1990, abandoned.

[51] Int. Cl.$^5$ .............................................. B22F 9/18
[52] U.S. Cl. ........................................ 75/622; 75/363
[58] Field of Search ................................ 75/622, 363

[56] References Cited

U.S. PATENT DOCUMENTS

| | | | |
|---|---|---|---|
| 4,032,328 | 6/1977 | Hurd | 75/622 X |
| 4,067,736 | 1/1978 | Vartanian | 75/251 |
| 4,149,876 | 4/1979 | Rerat | 75/363 |
| 4,231,790 | 11/1980 | Hähn et al. | 75/622 X |
| 4,684,399 | 8/1987 | Bergman et al. | 75/363 |
| 4,897,116 | 1/1990 | Scheel | 75/622 X |
| 4,954,169 | 9/1990 | Behrens | 75/228 |

*Primary Examiner*—Donald P. Walsh
*Assistant Examiner*—Daniel J. Jenkins
*Attorney, Agent, or Firm*—David J. Koris

[57] ABSTRACT

A process for producing a high purity tantalum powder wherein a small quantity of an active ingredient, having a higher thermodynamic potential and chemical activity than the metal surfaces of the reactor vessel, is added to the reactor before the reactor is heated to reaction temperatures.

19 Claims, No Drawings

METHOD OF PRODUCING HIGH SURFACE AREA, LOW METAL IMPURITY

This application is a continuation of application Ser. No. 07/525,364, filed May 17, 1990 now abandoned.

FIELD OF THE INVENTION

The present invention relates to a method for producing a high surface area, high purity tantalum powder.

BACKGROUND

Among its many uses, tantalum powder is generally utilized to produce tantalum capacitors. Solid tantalum capacitors are typically manufactured by compressing tantalum powder to form a pellet, sintering the pellet in a furnace to form a porous body, and then subjecting the porous body to anodization in a suitable electrolyte to form a continuous dielectric oxide film throughout the internal and external surface of the sintered porous body. The pores in the anode thus formed are then filled with a electrolyte. Then the entire anode body with filled pores is sealed to form a capacitor.

The quality of tantalum capacitors is generally determined by rating the capacitance, voltage capability, and current leakage of the capacitor. These characteristics are determined by the tantalum powder and the capacitor manufacturing process.

The surface area of the tantalum powder is important for the production of high quality capacitor. High surface area tantalum powder may be utilized to make high surface area anodes. The anode capacitance at a given voltage is directly related to anode surface area. High surface area anodes are therefore desirable.

The purity of the tantalum powder is also important to the production of high quality capacitors. Metallic and non-metallic impurities in the tantalum powder degrade the dielectric oxide film formed during the production of the capacitor. The degradation of the dielectric oxide film causes high current leakage from the capacitor. Using a tantalum powder with reduced impurities results in less degradation of the dielectric oxide film and therefore less current leakage. Therefore, using a high purity tantalum powder to produce capacitors is advantageous.

Utilizing a high sintering temperature or a high anodizing voltage in the production of the capacitor tends to alleviate the current leakage problem caused by high powder impurities. However, both methods reduce the net surface area of the anode and therefore the capacitance of the capacitor.

Tantalum powders are generally produced via one of two methods: a mechanical method, or a chemical method. The mechanical method includes the steps of: electron beam melting of tantalum powder to form an ingot, hydrating the ingot, milling the hydrides, dehydriding, cleaning, and heat treating. This method generally produces powder with high purity, which is utilized in capacitor applications where high voltage or high reliability is required. The mechanical method, however, suffers from high production costs. Additionally, the tantalum powders produced by the mechanical method generally have low surface areas.

The other generally utilized method for producing tantalum powder is the chemical method. The chemical method involves the chemical reduction of a tantalum compound, with an active metal, generally referred to as "the reducing agent", and then the subsequent cleaning and heat treatment of the tantalum powder. Typical tantalum compounds include, but are not limited to, potassium fluorotantalate ($K_2TaF_7$), sodium fluorotantalate ($Na_2TaF_7$), tantalum chloride ($TaCl_5$) and mixtures thereof. Generally the reducing agent is any metal capable of reducing the tantalum compound to tantalum metal including sodium, potassium, and mixtures thereof. The powder is sometimes further mechanically milled to enhance the surface area or porosity. Tantalum powders produced by the chemical method generally have surface areas higher than powders produced by the mechanical method. However, tantalum powders produced by the chemical method generally also have higher impurity levels than powders produced by the mechanical method.

In more detail, various techniques have been practiced for the production of tantalum powders by the chemical method. See for example, U.S. Pat. No. 4,067,736. A review of typical techniques is also set forth in the background section of U.S. Pat. No. 4,684,399, assigned to Cabot Corporation and the disclosure of which is hereby incorporated by reference.

Potassium fluorotantalate ($K_2TaF_7$), a tantalum salt, can be electrolytically reduced to tantalum in a molten bath with diluent chloride and fluoride salts of sodium and potassium. Production rate is limited to the electrolysis parameters of current and voltage. Since the concentration gradients established prevent obtaining a high yield, the production rate is relatively low. The resulting tantalum powders tend to be coarse and dendritic, and produce anodes for electrolytic capacitors having very low capacitive charge. Considerable impurities are transferred to the product due to the galvanic corrosive activity on the reaction vessel components.

Tantalum powder also can be made by exothermic reaction in a inert atmosphere wherein the $K_2TaF_7$ is mixed with a reducing agent. See example U.S. Pat. No. 4,231,790. The enclosed charge is indirectly heated until the exothermic reaction is spontaneously initiated. The ensuing uncontrollable reaction produces powders having a wide range of particle sizes. Although these powders have larger surface areas per unit weight than electrolytic powders, they must be classified extensively in order for them to be usable in the manufacture of anodes for electrolytic capacitors.

Commonly, tantalum powder is commercially produced by adding sodium to $K_2TaF_7$ which has been previously dissolved in molten salt or molten diluent. In this reaction the $K_2TaF_7$ and diluent salts are heated in a reaction vessel to a temperature above the melting point of the salt mixture. Liquid sodium then is added. The bath is held at essentially isothermal conditions while being stirred by an internal agitator. The resulting powder has a wide range of particles sizes. In order for these materials to be acceptable for the manufacture of anodes for electrolytic capacitors, they may require extensive classification to obtain the desired particle size distributions. The capacitive charge that can be obtained from anodes derived from these powders typically is in the intermediate range; greater than a low range of less than 7000 cv/g, and generally not as high as an upper range of greater than 15000 cv/g.

A modification of this stirred liquid phase reaction scheme involves the introduction of diluent salts to the stirred reaction bath. The addition of diluents such as NaCl and KCl to $K_2TaF_7$ allows the use of lower bath temperatures. However, this modified process results in agglomerates of finely divided material, a tendency to pick-up impurities, and the production of excessive fines.

In another method, solid diluent salt and $K_2TaF_7$ are mulled with liquid sodium and the mixture is heated to the point of initiating a spontaneous exothermic reaction. The exothermic reaction generated is not easily controlled and, therefore, the powder characteristics include varying particle sizes, broad particle size distributions, and varying electrical characteristics. These powders require classification to remove fine and coarse particles prior to their utilization in the manufacture of anodes for electrolytic capacitors.

As discussed above, the capacitance of a tantalum pellet is a direct function of the surface area of the sintered powder. Greater surface area can be achieved, of course, by increasing the grams of powder per pellet. Cost considerations however, have dictated that development be focused on means to increase the surface area per gram of powder utilized. Since decreasing the particle size of the tantalum powder produces more surface area per unit of weight, effort has been extended into ways of making the tantalum particles smaller without introducing other adverse characteristics that often accompany size reduction.

Various tantalum powder process techniques have been practiced which attempt to maximize the production of a powder having a select, small desired particle size and, therefore, increased surface area. For example, U.S. Pat. No. 4,149,876 teaches techniques for controlling particle size of tantalum powder product in a reduction process wherein liquid sodium is added to a molten bath of $K_2TaF_7$ and a diluent salt. Sodium metal is added at an elevated rate until the reduction temperature is reached. It is reported that the rate of sodium injection (feed rate into the reactor) has an inverse effect on the particle size of the finished product. Critical to maintaining temperature control for high sodium injection rates is the ability to extract heat by means of forced cooling of the reaction mass in the reaction vessel. Use of forced cooling is reported to significantly reduce the overall process time and further reduced the particle size for the powder produced.

Another factor which contributes to forming high surface area tantalum powders is the use of large amounts of diluents, such as sodium chloride, in the reduction reaction. These diluents may also serve as an internal heat absorber for the system.

A further factor important to producing a fine particle size, high surface area tantalum powder, is the temperature at which sodium is injected into the molten bath. Lower temperatures facilitate fine particle size formation.

Another important factor in the control of particle size is the temperature of reduction. As disclosed, temperatures from about 760° to about 850° C. tended to produce smaller particles, while the temperatures from about 850° to about 1000° C. tend to produce somewhat larger particles.

According to U.S. Pat. No. 4,149,876, it is particularly advantageous to use the above-described techniques, in combination (large amounts of diluent salt, low initial molten bath temperature, very fast sodium feed rate, and use of forced cooling to maintain constant temperature during the growth period), to produce a uniform, fine particle size, high surface area tantalum powder.

In all the previous reaction schemes outlined above, wherein tantalum powder is produced by reducing a tantalum compound with a reducing metal, the reactants are either mixed together and then heated in a closed vessel until an exothermic reaction is spontaneously initiated, or, a molten bath of the tantalum compound is maintained and reducing metal is fed into the bath so as to reduce the tantalum compound to tantalum powder.

In Japanese Patent Disclosure Sho 38-8 (1963), it was shown that a tantalum metal product suitable for metallurgical purposes could be made by a method wherein $K_2TaF_7$ crystals, heated to a temperature below about 500° C. were gradually dropped into a bath of sodium maintained at a temperature near its boiling point.

A later Japanese Patent Disclosure Sho 43-25910 (1968) reviewed the Sho 38-8 disclosure and stated that while the earlier reference disclosed a method for producing a tantalum product featuring purity favorable for metallurgical utility, such a product having a particle size range from less than 5 microns to more than 100 microns would be unsuitable for capacitor applications. This later reference then discloses a modification of the earlier method wherein molten $K_2TaF_7$, including diluents, is added slowly to a stirred liquid sodium bath. A tantalum powder of between 5 microns and 100 microns, having a specific surface area less than about 750 $cm^2/g$, is produced. However, while this reference defines this product as being capacitor grade tantalum powder, by current standards, this powder would feature unacceptably low capacitance for capacitor utility.

U.S. Pat. No. 4,684,399 discloses a process for producing tantalum powder wherein a tantalum compound is added in a continuous or incremental manner to a reactor during the course of the reaction with a reducing metal. The rate of continuous addition or the amount of each increment can be varied depending on the particular tantalum powder product characteristics desired. Continuous addition, or the addition of smaller increments tend to favor increased capacitance. The addition of the reducing agent as a single unitary charge prior to the introduction of the tantalum compound, or alternatively, in a continuous or semi-continuous manner is also disclosed.

Hereafter, the term "continuous" addition refers to a non-interrupted period of addition of tantalum compound or reducing agent. "Semi-continuous" addition refers to a constant rate of addition of reducing agent which is interrupted.

It is also known to utilize the above described methods with various dopants to increase the yield of fine particle sizes. U.S. Pat. Nos. 3,825,802 and 4,009,007 disclose the use of phosphorous as a means for improving the electrostatic capacity of capacitors and the flow properties of tantalum powder. U.S. Pat. No. 4,582,530 discloses the addition of sulfur as a doping agent. The use of boron and other dopants are also known to those skilled in the art As previously discussed, an important consideration in the production of tantalum powder for use in capacitors is the purity level. Impurities generally adversely affect the performance of capacitors. The impurities commonly appearing in tantalum powder may be generally categorized as lighter impurities and heavier impurities. The lighter impurities include carbon, calcium, and aluminum which generally come from water used to wash the powder; fluorine, chlorine, sodium, and potassium, which are from the reaction mass; nitrogen and hydrogen, which may form when the tantalum powder contacts air or water; and silicon, which comes from the potassium salt and sometimes from water. Generally, most of the lighter impurities evaporate during sintering and therefore the lighter impurities do not significantly adversely affect capacitor performance.

The heavier impurities include Fe, Ni, Cr, Mo, Co and other metals. In contrast to the lighter impuritie, the heavier impurities generally remain in the powder even after high temperature sintering. Therefore, unless the level of heavier impurities in the tantalum powder is reduced during the formation of the tantalum powder, the heavier impurities will remain and adversely affect capacitor performance.

Generally the source of the heavier impurities is the equipment utilized in the reduction step of the process for producing tantalum powder. This equipment includes the reduction cell, lid, and agitator which have contact with the reaction mass. The equipment is generally made of nickel, iron, or alloys which are easily attacked by the reaction components under reaction conditions.

According to one theory, heavier impurities are produced by processes wherein a thin film of metal oxide is formed on the metal surface of the reactor and the film is dissolved to form metal ions which are incorporated into the tantalum powder matrix during the powder formation process. The thin film of metal oxide may be formed by residual air in the reactor attacking the metal surface of the reactor. At process temperatures of about 80° C. or above, metal oxides form more rapidly. Alternatively, water absorbed by the diluent salts or the tantalum compound, is released at temperatures above about 80° C. and attacks the metal surface of the reactor to form a thin film of metal oxide. When the diluent salts or the potassium salt reach the molten state through reaction heat or external heating, the thin metal oxide film dissolves in the molten mass to form metal ions.

It would be advantageous to produce a high surface area, high purity tantalum powder by preventing the formation of the metal oxide film on metal surfaces of the reactor and thereby remove the source of the heavier impurities during the production of tantalum powder.

SUMMARY OF THE INVENTION

I have discovered a novel method for producing high purity tantalum powder which prevents the formation of metal oxide films on metal surfaces of a reaction cell, thereby limiting the source of heavier impurities. According to the present invention, a small quantity of an active ingredient, having a higher thermodynamic potential and chemical activity than the metal surfaces of the reactor vessel being utilized to produce tantalum powder, is added to the reactor the reactor is heated to reaction temperature.

Although the present invention should be so limited, one theory for the low levels of impurities the active ingredient reacts with free air or moisture present in the cell during heating and thereby prevents the free air or moisture from reacting with metal surfaces of the reaction cell to form metal oxide film.

The active ingredient may be any compound which has a hiigher thermodynamic potential and chemical activity than the metals of the reactor and agitator at reaction temperatures. The terms "thermodynamic potential" and "chemical activity" refer to the equilibrium constant and to the reaction rate of the active ingredient in getting oxidizing agents.

The active ingredients include, but are not limited to, alkali metals and earth alkali metals. Other elements such as carbon or silicon may be used which satisfy the thermodynamic potential and chemical activity criteria for an active ingredient. Preferred active ingredients are sodium and potassium. After reacting with oxygen or moisture, these metals form sodium and potassium ions which are part of the salt and therefore do not contaminate the tantalum product. Furthermore, sodium and potassium have lower melting and high vapor pressure, and therefore, are more active than other elements. Other active ingredients include those elements which oxidize and subsequently evaporated from or remain in molten diluent. They included elements such as cesium or rubidium to name a few.

The quantity of active ingredient added to the reactor is at least an amount of active ingredient sufficient to react with a portion of and preferably all the moisture and free oxygen in the reactor. Generally this amount is greater than 1 gram depending on the moisture level and the amount of air in the reactor vessel.

The active ingredient added to the reactor includes some oxide on its surface. More oxide is produced by the reaction between the active ingredient and the air or moisture in the reactor. This active ingredient-oxide serves as a dopant to reduce the surface tension of the molten salt, and as a nucleation agent during the reduction phase resulting in finer tantalum particles. In to the dopants discussed above, active ingredient-oxides purposely added to the reaction mass to further reduce tantalum particle size.

After the introduction of the active ingredient, the reactor is heated and a tantalum compound is reduced to tantalum metal by reaction with a reducing agent in any manner generally known to the art. Preferably, the tantalum compound is reduced to tantalum metal by reaction a reducing metal. As discussed above, the tantalum compound and/or the reducing metal is introduced to the reactor in continuous or incremental manner during the course of the reduction reaction. The rate of continuous addition, or the amount of each increment may be varied to produce tantalum powder products with varied characteristics. Continuous or smaller increments tend to favor surface area.

The tantalum compound may any compound reducible to tantalum metal by reaction with reducing metal, and may be utilized in any physical state is convenient or desirable. Such compounds typically may include potassium fluorotantalate ($K_2TaF_7$), sodium fluorotantalate ($Na_2TaF_7$), tantalum chloride ($TaCl_5$), and mixtures thereof. Potassium fluoroniobium ($K_2NbF_7$) and potassium fluorocolumbium ($K_2CbF_7$) may also be included in the definition because of their chemical similarities with tantalum. The preferred tantalum compound is potassium fluorotantalate. Although the preferred form for $K_2TaF_7$ addition is as a solid, other forms are acceptable.

The reduction reaction produces tantalum powder and metal salts. After the reducing reaction has been run to completion, the reaction mass of tantalum powder and metal salts is processed by leaching with water to dissolve the salts followed by acid wash prior to recovery of the tantalum powder. The tantalum powder is then dried, screened, doped, and heat treated by methods know to those skilled in the art. The powder may also be blended with other tantalum powders and then screened, doped, and heat treated.

The method of the present invention produces tantalum powder featuring Fisher subsieve particle sizes less than 5 microns and BET surface areas greater than about 0.2 $m^2/g$ Purity levels of iron, nickel, chromium and molybdenum are each less than 15 ppm in contrast to typical levels of iron and nickel of greater than 15 ppm for similar equipment employed.

One advantage of the method of the present invention is that the method of the present invention produces tantalum powder with reduced impurity levels.

An advantage of the preferred method of the present invention, wherein the tantalum compound and/or the reducing compound are added to the reactor in a continuous or incremental manner during the course of the reduction reaction, is that the preferred method produces high surface area tantalum powder with lower impurity levels which is especially advantageous for use in capacitors.

Other advantages of the present invention will become apparent from the following more detailed description and the claims.

DETAILED DESCRIPTION OF THE INVENTION

According to the present invention, a small quantity of an active ingredient, having a higher thermodynamic potential and chemical activity than metal surfaces of the reactor vessel being utilized to produce tantalum powder, is added to the reactor before the reactor is heated to reaction temperature, and then reduction of a tantalum compound by a reducing agent is performed in the reactor to produce tantalum powder. The active ingredient attracts air and moisture inside the reactor to prevent the air and moisture from reacting with metal surfaces of the reactor to form oxide films on the metal surfaces of the reactor. The amount of active ingredient added to the reactor is an amount sufficient to attract at least a portion and preferably all of the air and moisture present in the reactor. After the addition of the active ingredient and diluents are added, the reactor is purged with inert gas or evacuated with vacuum to reduce the amount of air and moisture inside the vessel. The reactor is then heated and the tantalum compound reduction reaction is initiated. The term diluent generally refers to, but not limits to, alkali halides including but not limiting to potassium chloride, sodium chloride, potassium fluoride and sodium fluoride.

The reactors utilized in the method of the present invention may be the reactors generally those of ordinary skill in the art for the production of tantalum powder via the reduction of a tantalum compound. Generally, a typical reactor assembly includes a reaction a fitted lid, an agitator, a thermowell, gas inlet and outlet ports, and ports for loading (charging the reactor) and removing materials. Typically reactor and the agitator are made of pure nickel, nickel based alloys, or iron based alloys.

In one embodiment of the present invention, high purity high surface areas, tantalum powder is produced as follows. A pure nickel reactor is assembled and checked for air tightness as discussed below in Example 1. Then a charge port of the reactor is opened and a small amount of the active ingredient is added to the reactor. After the active ingredient, compounds, generally salts of potassium, which form the diluent, are added to the reactor. Those skilled in the art will recognize that the active ingredient may be added after the addition of diluents or simultaneously thereto. Preferably, the active ingredient is added prior to the diluent, tantalum compound and reducing compound. After the addition of these compounds, the loaded reactor is purged with argon for about 4 hours to further reduce air and moisture contact.

The loaded reactor may then be transferred to a furnace and heated to approximately 500° C. for about four hours.

After purging for 4 hours, or alternatively, preheating for the same time, the temperature is increased to between 700° C. and 900° C. and held there for a period of time to ensure that the diluent is molten. After about 5 to 60 minutes, the agitator is engaged to agitate the molten mixture, and the reducing compound is preferably introduced into the reactor, preferably in a continuous manner. Alternatively, the tantalum compound may be added before the addition of reducing compound.

The tantalum salt is preferably charged the reactor incrementally. Generally, the timing of the increment addition is synchronized with the addition of the reducing compound so that a tantalum compound increment is added when the amount of reducing compound reaches a specified level. Alternatively, the tantalum compound may be added continuously to the reactor and the reducing compound is added incrementally. However, both tantalum compound and reducing compound may be added continuously, or both may be added incrementally.

After the addition of a specified amount of the tantalum compound and reducing compound, the addition of each compound is stopped. The reactor is then heated to a sufficient temperature and for a sufficient period of time to permit the reduction reaction between the tantalum compound and the reducing compound to be completed, while the agitator continues to stir the molten mixture in the reactor. Generally, to produce 130 pounds of tantalum powder, approximately 280 pounds of the tantalum compound and 83 pounds of the reducing compound (which represents one pound of excess), are added to the reactor.

After the reduction reaction is completed, the reactor is cooled by circulating air or water. After the reactor has cooled sufficiently, the reactor is opened. Steam and water are sequentially injected into the reactor to neutralize the excess sodium.

The reaction mass is then mechanically converted into approximately 1 inch cubes and washed with water to remove diluent salts and to extract tantalum powder.

The extracted tantalum powder is then treated with acids to remove residual impurities on the powder surface. If the reduction reaction has been performed in a manner which yields approximately 80 to 130 pounds of tantalum powder, approximately 8-12 liters (1) $H_2O$, 12-16 l HCl, 0-4 $HNO_3$, and 0.5-1.0 l HF are added to the powder in the vessel for the acid wash.

The tantalum powders produced by the method of the present invention may be utilized in any manner known to those of ordinary skill in the art.

Generally, for use in capacitors, the tantalum powder is screened, doped, heat treated, deoxidized, pressed into pellets, sintered at about 1400° to about 1700° C., and then anodized. As the particular process for forming capacitors is known in the art and not significant to the present invention, no further discussions will follow.

The following testing procedures are used in the determination and evaluation of the analytical properties and the physical properties of the capacitors incorporating the tantalum powders produced by the method of the present invention.

Surface area determination of the tantalum powder were conducted using the nitrogen Brunauer, Emmett, Teller (BET) method. Particle sizes were determined using the Fisher subsieve procedure (ASTM 30 B330-82). The purity of the tantalum powder was determined by a spectrographical by methods know in the art having a detection limit of 5 ppm for iron, nickel, chromium, and molybdenum.

Additional features and advantages of the present invention will become apparent from the following examples.

EXAMPLE 1

A reactor and reactor lid made of pure nickel were cleaned. An agitator with blades made of Hastalloy C276 alloy, a nickel based alloy, and a shaft made of Hastalloy X alloy were cleaned, and the reactor assembly, comprising a reactor cell, a reactor lid, and an agitator were assembled. The reactor assembly was checked for air tightness by evacuating to 5 inch Hg (absolute), and held at vacuum for 5 minutes. If the pressure increase, was less than 2 inches in 5 minutes, the reactor assembly was considered to be sufficiently tight.

A charge port of the reactor was then opened and the following diluent compounds were added to the reactor in the order and amounts shown below:

| Compound | Amount |
|---|---|
| Potassium Fluoride (KF) | 50 lbs. |
| Potassium Sulfate ($K_2SO_4$) | 30 gms. |
| Potassium Chloride (KCl) | 250 lbs. |

The loaded reactor was then transferred, to a conventional hopper type furnace and the reactor was purged with argon at a rate of 60 SCFH (standard cubic feet per hour) for approximately 10 hours with the furnace at ambient temperature; approximately 25° C. The furnace was then heated to 225° C. and maintained at that temperature for 4 hours. After 4 hours, the temperature of the reactor was increased to about 850° C. and held there for approximately 40 minutes to ensure that the diluent was molten. The agitator was then engaged to agitate the molten mixture in the reactor.

Liquid sodium preheated to about 125° C., was introduced into the reactor in a continuous manner, at a rate of 1 pound per minute.

At this point $K_2TaF_7$ was charged into the reactor in twelve, 20 pound increments. The first increment was placed in the reactor when the accumulated sodium charge reached approximately 2.5 pounds. Each increment may vary to as much as 1 pound. The remaining 11 increments were added to the reactor when the accumulated sodium charge reached approximately 8, 14, 21, 27, 33, 39, 45, 51, 57, 63 and 69 pounds respectively.

When the total sodium charge reached 71 to 72 pounds, the addition of liquid sodium was stopped, and the reactor was heated to 900° C. for two hours, with continued agitation.

After two hours, the reactor was cooled to below about 100° C. by fanning the reactor with air. Steam and then water were added to the reactor to remove residual sodium and potassium. The reactor was then opened and the water decanted. The washed solid reaction mass was then mechanically converted into approximately 1 inch cubes.

The whole reaction mass was water then washed for removal of salts by placing the cubes in a tank and adding water. After decanting the water, a mixture of HCl, HF, and $HNO_3$ as generally discussed above were added to the reactor.

After the salts were removed, the tantalum powder was treated with acid mixture including HCl, HF, and $HNO_3$. The entire vessel was then rotated for about 30-60 minutes to ensure complete contact between the reaction mass and the acid mixture. After decanting, the acid leached powder was then rinsed thoroughly to remove residual acid, and then dried.

The properties of the tantalum powder, produced by the method of Example 1, are tabulated in Table 1.

EXAMPLES 2, 3, 4, AND 5

The following compounds were added to the reactor assembly and prepared as in Example 1. The sodium rod was added prior to the diluent materials below.

| Compound | Amount |
|---|---|
| Sodium rod | 1 lb. |
| KF | 50 lbs. |
| $K_2SO_4$ | 30 gms. |
| KCl | 250 lbs. |

The sodium rod was in the form of cylinder with approximately 2 ½ inch in diameter and 8 inches, in length.

After the reactor was loaded, the remaining steps of Example 1 were followed. The properties of the tantalum powder produced for Examples 2-5 are tabulated as follows:

TABLE 1

| EXAMPLE No. | NA LB | FSS Micron | BET $M^2$/g | $O_2$ PPM | Fe PPM | Ni PPM | Cr PPM | Mo PPM |
|---|---|---|---|---|---|---|---|---|
| 1 | 0 | 0.89 | 0.77 | 2915 | 25 | 20 | <5 | <5 |
| 2 | 1 | 0.65 | 1.21 | 5170 | <5 | <5 | <5 | <5 |
| 3 | 1 | 0.69 | 1.36 | 5255 | <5 | <5 | <5 | <5 |
| 4 | 1 | 0.55 | 1.92 | 6720 | <5 | <5 | <5 | <5 |
| 5 | 1 | 0.67 | 1.13 | 4095 | <5 | <5 | <5 | <5 |

EXAMPLE 6

The procedure of Example 1 was followed including preparation and assembly of the reactor, compound addition, purging, and heating to about to 850° C. In this example, the liquid sodium was also added at a continuous rate of 1 pound/min. Potassium fluorotantalate was charged into the reactor in ten 28 pound increments instead of twelve 20 pound increments as used in Examples 2-5. The first increment was added when the accumulated sodium charge reached about 3.5 pounds. The remaining nine increments were added when the sodium charge reached about 12, 20, 28, 36, 45, 53, 61, 69, 77 pounds respectively.

When the total sodium charge reached about 83 pounds, liquid sodium addition was stopped. The remaining steps followed were as presented in Example 1.

The properties of the tantalum powder produced are tabulated in Table 2.

EXAMPLE 7

The procedure of Example 6 was followed with the exception that 1 lb. of sodium, in the form of a 2½"

diameter by 8" long cylinder was added to the reactor before the diluents and compounds of Example 6 were charged.

The properties of tantalum powder produced are as follows:

TABLE 2

| EXAMPLE NO. | NA LB | FSS Micron | BET M²/g | O₂ PPM | Fe PPM | Ni PPM | Cr PPM | Mo PPM |
|---|---|---|---|---|---|---|---|---|
| 6 | 0 | 1.16 | 0.79 | 2700 | 15 | 30 | <5 | <5 |
| 7 | 1 | 0.82 | 0.90 | 3385 | <5 | <5 | <5 | <5 |

EXAMPLE 8

A nickel reactor assembly was assembled and checked for air tightness following the procedure described in Example 1. The following compounds were added to the reactor:

| Compound | Quantity |
|---|---|
| Sodium rod | ¼ lb. |
| KF | 50 lbs. |
| K₂SO₄ | 10 gms. |
| KCl | 150 lbs. |

The sodium rod used was in the form of a 2½" diameter by 2" length cylinder.

The remaining steps described in Examples 6 and 7 were then followed. The properties of the powder produced are as follows.

| FSS | 1.35 micron |
|---|---|
| BET | 0.59 M²/g |
| O₂ | 2145 PPM |
| Fe | <5 |
| Ni | <5 |
| Cr | <5 |
| Mo | <5 |

EXAMPLE 9

The reactor equipment was assembled and cleaned according to the procedure set forth in Example 1. The reactor was then charged with 150 pounds of potassium fluoride and 150 pounds of potassium chloride. The reactor was then purged with argon at 60 SCFH for approximately 10 hours at ambient conditions prior to heating to 500° C. for 4 hours. The furnace was then brought up to 820° C., for a period of about 30 minutes followed by agitation. Liquid sodium, preheated to 125° C. was then added to the reactor at a rate of 1 pound per minute. Ten 20 pound increments of K₂TaF₇ were then added to the reactor when the accumulated sodium reached about 6, 12, 18, 24, 30, 36, 42, 48, 54, and 56 lbs. When 60 lbs. of sodium had been added to the reactor, sodium addition was stopped. The reactor was then heated to 900° C., prior to cooling and extraction as discussed in the prior examples.

Properties of the tantalum powder generated are listed as follows:

| FSS | 1.17 micron |
|---|---|
| O₂ | 2685 PPM |
| Fe | 25 |
| Ni | 35 |
| Cr | 20 |
| Mo | <5 |

EXAMPLE 10

The reactor vessel was assembled and prepared in accordance with the procedures of Example 1 above. The reactor was then charged with 1 pound of sodium, in rod form, followed by 100 pounds of potassium fluoride and 200 pounds of potassium chloride. The vessel was then purged with argon at 60 SCFH at about 25° C. for about 10 hours. The reactor was then heated in a furnace at about 225° C. for about 4 hours. The furnace temperature was then raised to 820° C. for 30 minutes followed by agitation. About 28 pounds of K₂TaF₇ were then added, immediately after commencing the addition of liquid sodium. The sodium was preheated to 125° C. and was added at a rate of about 0.75 pounds per minute. The remaining nine increments of K₂TaF₇ were added when the accumulated quantity of sodium in the reactor reached approximately 7, 15, 23, 32, 40, 48, 56, 65, and 73.0 pounds respectively. When 83 pounds of sodium had been added, sodium addition was stopped. The remaining steps for treating the reactor material were the same as set forth in Example 9.

The properties of the tantalum powder produced by this Example are as follows:

| FSS | 1.17 micron |
|---|---|
| O₂ | 3190 |
| Fe | 5 |
| Ni | 10 |
| Cr | <5 |
| Mo | <5 |

The properties of tantalum powder produced by the steps of Example 10 with the exception of the addition of 1 pound of sodium are as follows:

| FSS | 1.93 micron |
|---|---|
| O₂ | 1895 |
| Fe | 15 |
| Ni | 45 |
| Cr | <5 |
| Mo | <5 |

I claim:

1. A process for producing tantalum powder in a reactor vessel comprising:
    adding a quantity of an active ingredient to the reactor sufficient to remove a portion of the moisture and air in the reactor, said active ingredient having a higher thermodynamic potential and chemical activity than the reactor vessel, and
    reducing a tantalum compound with a reducing agent in the reactor to form tantalum powder.

2. The process of claim 1 wherein said active ingredient is selected from the group consisting of alkali metals, and alkali earth metals.

3. The process of claim 2 wherein said process for reducing a tantalum compound comprises:
    introducing said tantalum compound and said reducing agent in a continuous, semi-continuous, or incremental manner to the reactor during the course of said reduction reaction.

4. The process of claim 3 wherein said tantalum compound is selected from the group consisting of potassium fluorotantalate, sodium fluorotantalate, tantalum chloride and mixtures thereof.

5. The process of claim 4 wherein said active ingredient is selected from the group consisting of sodium and potassium.

6. The process of claim 5 wherein said reducing agent is selected from the group consisting of sodium, potassium, and mixtures thereof.

7. A process for producing tantalum powder in a reactor vessel comprising:
adding a quantity of an active ingredient to the reactor sufficient to remove a portion of the moisture and air in the reactor, said active ingredient having a higher thermodynamic potential and chemical activity than the reactor, and
reducing potassium fluorotantalate with a sodium compound by adding said potassium fluorotantalate to the reactor incrementally and said sodium compound continuously to form tantalum powder with improved purity.

8. A process for producing tantalum powder in a reactor vessel comprising the steps of:
a. adding a quantity of an active ingredient to the reactor sufficient to remove a portion of the moisture and air in the reactor, said active ingredient having a higher thermodynamic potential and chemical activity that the reactor, and
b. reducing potassium fluorotantalate with sodium by adding said potassium fluorotantalate incrementally and said sodium continuously to form tantalum powder with improved purity and an average particle size of less than 2.5 microns.

9. The process of claim 8 wherein said active ingredient is selected from the group consisting of alkali metals, and alkali earth metals.

10. The process of claim 9 wherein said quantity of active ingredient is at least about 1 gram.

11. A process for producing tantalum powder in a reactor vessel comprising:
adding a quantity of sodium to the reactor sufficient to remove all of the moisture and air in the reactor, said quantity of sodium having a higher thermodynamic potential and chemical activity than the reactor vessel, and
reducing potassium fluorotantalate with a sodium compound, said potassium fluorotantalate and said sodium compound added to the reactor vessel in an incremental and continuous manner respectively, to form tantalum powder with improved purity.

12. The process of claim 11 wherein said quantity of sodium sufficient is at least about 1 gram.

13. The process of claim 12 wherein said tantalum powder includes nickel and iron impurities of less than 15 ppm.

14. The process of claim 7 wherein said reactor is heated to a reaction temperature of between about 500° C. and about 700° C.

15. The process of claim 14 wherein said active ingredient i added prior to achieving said reaction temperature.

16. The process of claim 15 wherein said active ingredient forms an oxide which acts as a nucleating agent in the formation of fine tantalum powder.

17. The process of claim 13 wherein said tantalum powder has an average particle size of less than 2.5 microns.

18. The process of claim 17 wherein said tantalum powder has an oxygen level of less than 7000 ppm.

19. A process for producing tantalum powder in a reactor vessel comprising:
adding a quantity of sodium to the reactor with a quantity of diluent and a quantity of potassium fluorotantalate to the reactor, said quantity of sodium sufficient to remove substantially all of the moisture in the reactor;
bringing the reactor to a temperature of between about 800° C. and about 900° C.;
adding liquid sodium to the reactor in a continuous manner,
reducing said potassium fluorotantalate powder to form tantalum powder having an average particle size of less than 2.5 microns and improved purity.

* * * * *